US010528188B2

(12) United States Patent
Shiomi (10) Patent No.: US 10,528,188 B2
(45) Date of Patent: Jan. 7, 2020

(54) OPERATION INPUT DEVICE AND OPERATION INPUT METHOD (71) Applicant: KYOCERA Document Solutions Inc., Osaka-shi, Osaka (JP)

(72) Inventor: Ryo Shiomi, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/883,886

(22) Filed: Jan. 30, 2018

(65) Prior Publication Data
US 2018/0225005 A1 Aug. 9, 2018

(30) Foreign Application Priority Data

Feb. 8, 2017 (JP) .................. 2017-021350

(51) Int. Cl.
*G06F 3/041* (2006.01)
*G06F 3/0488* (2013.01)

(52) U.S. Cl.
CPC ........ *G06F 3/0418* (2013.01); *G06F 3/04883* (2013.01); *G06F 2203/04108* (2013.01)

(58) Field of Classification Search
CPC ............... G06F 3/0418; G06F 3/04883; G06F 2203/04108
See application file for complete search history.

(56) References Cited

U.S. PATENT DOCUMENTS

| 2004/0243747 | A1 | 12/2004 | Rekimoto | |
|---|---|---|---|---|
| 2009/0095540 | A1 | 4/2009 | Zachut et al. | |
| 2013/0300696 | A1* | 11/2013 | Haran | G06F 3/041 |
| | | | | 345/173 |
| 2014/0293165 | A1 | 10/2014 | Rekimoto | |
| 2014/0300579 | A1 | 10/2014 | Rekimoto | |
| 2015/0054787 | A1 | 2/2015 | Rekimoto | |
| 2015/0242008 | A1* | 8/2015 | Beckman | G06F 3/043 |
| | | | | 345/177 |
| 2015/0277661 | A1 | 10/2015 | Morinaga et al. | |
| 2015/0301713 | A1* | 10/2015 | Suda | G06F 3/0487 |
| | | | | 715/762 |
| 2015/0347009 | A1 | 12/2015 | Rekimoto | |

FOREIGN PATENT DOCUMENTS

| JP | 2002342033 A | 11/2002 |
|---|---|---|
| JP | 2011501261 A | 1/2011 |
| JP | 2013109529 A | 6/2013 |
| JP | 2014052778 A | 3/2014 |
| JP | 2014063222 A | 4/2014 |
| JP | 2014078116 A | 5/2014 |

OTHER PUBLICATIONS

Japanese Patent Office, Office Action Issued in Application No. 2017021350, dated Jun. 11, 2019, 5 pages.

* cited by examiner

*Primary Examiner* — Amare Mengistu
*Assistant Examiner* — Jennifer L Zubajlo
(74) *Attorney, Agent, or Firm* — Alleman Hall Creasman & Tuttle LLP (57) ABSTRACT

An operation input device includes a touch panel, a hand detecting processor, and a region setting processor. The hand detecting processor detects a position and a shape of a hand that is proximate to the touch panel. The region setting processor sets a touch invalid region in the touch panel based on the position and the shape of the hand detected by the hand detecting processor.

4 Claims, 10 Drawing Sheets

OPERATION INPUT DEVICE AND OPERATION INPUT METHOD

INCORPORATION BY REFERENCE

This application is based upon and claims the benefit of priority from the corresponding Japanese Patent Application No. 2017-021350 filed on Feb. 8, 2017, the entire contents of which are incorporated herein by reference.

BACKGROUND

The present disclosure relates to an operation input device and an operation input method.

There is known a communication terminal apparatus in which a detection invalid region is set in correspondence with a position of an object that is displayed on a display panel of a touch panel as a target of input operation, wherein input operations performed in the detection invalid region are invalidated.

In addition, there is known a user input device that can detect a position and a shape of a hand that is proximate to a user input region.

SUMMARY

An operation input device according to an aspect of the present disclosure includes a touch panel, a hand detecting processor, and a region setting processor. The hand detecting processor detects a position and a shape of a hand that is proximate to the touch panel. The region setting processor sets a touch invalid region in the touch panel based on the position and the shape of the hand detected by the hand detecting processor.

An operation input method according to another aspect of the present disclosure includes a hand detecting step and a region setting step. In the hand detecting step, a position and a shape of a hand that is proximate to a touch panel are detected. In the region setting step, a touch invalid region is set in the touch panel based on the position and the shape of the hand detected in the hand detecting step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Configuration of Operation Input Device]

Figure 1:
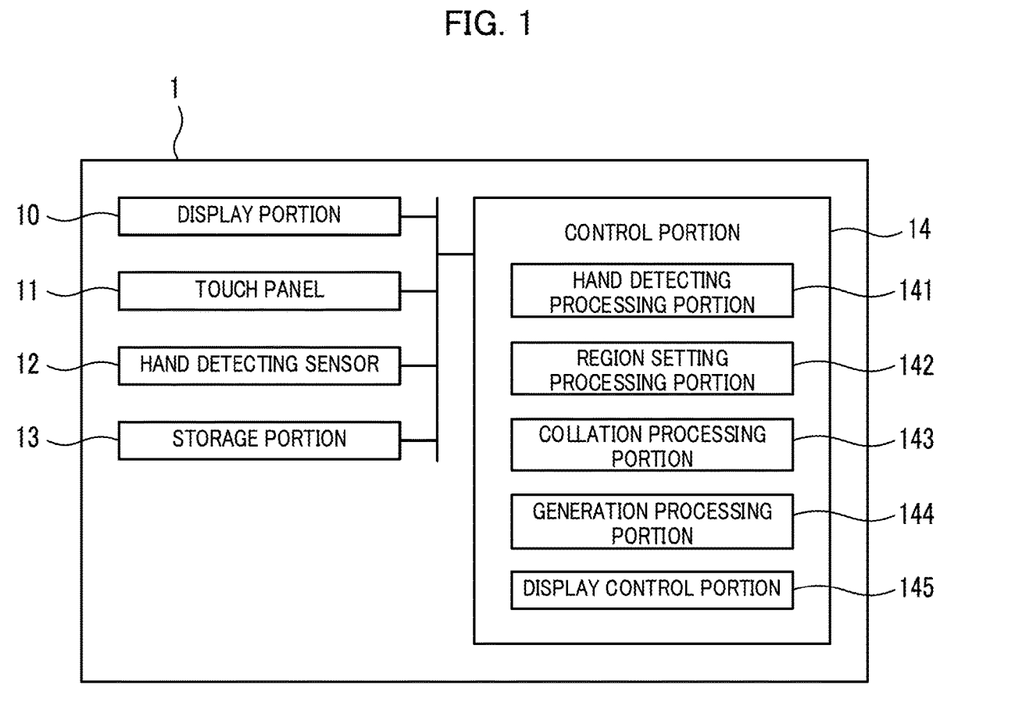
FIG. 1 is a block diagram showing a system configuration of an operation input device according to an embodiment of the present disclosure.

As shown in FIG. 1, an operation input device 1 according to the present embodiment includes a display portion 10, a touch panel 11, a hand detecting sensor 12, a storage portion 13, and a control portion 14. The operation input device 1 is, for example, a tablet PC, a smartphone, an electronic book reader, or a mobile information terminal. The storage portion 13 is an example of the pattern storage of the present disclosure.

The display portion 10 is, for example, a liquid crystal display, and displays, for example, a home screen and screens generated by various types of application software.

The touch panel 11 is provided on the display portion 10, and when a user performs a touch operation on the display portion 10, outputs a signal indicating a touch position of the touch operation.

Meanwhile, there is known a communication terminal apparatus in which a detection invalid region is set in correspondence with a position of an object that is displayed on a display panel of a touch panel as a target of input operation, wherein input operations performed in the detection invalid region are invalidated. In the communication terminal apparatus, the detection invalid region cannot be set appropriately when, for example, lots of objects are displayed in a dispersion state on the display panel. On the other hand, in the operation input device 1 according to the present embodiment, it is possible to set a touch invalid region A1 (see FIG. 6A) appropriately based on a position and a shape of a hand that is proximate to the touch panel 11.

The hand detecting sensor 12 outputs a signal that corresponds to a position and a shape of a hand (which includes a part of the hand) that is in proximity to the touch panel 11. That is, the hand detecting sensor 12 outputs a signal that corresponds to a position and a shape of a hand that is not in contact with the touch panel 11. Here, it suffices that the hand is positioned at least in a two-dimensional direction (namely, the up-down direction and the left-right direction in FIG. 2A) along the touch panel 11.

Various configurations may be considered as the configuration of the hand detecting sensor 12. For example, the hand detecting sensor 12 may be composed of a plurality of capacitance-type proximity sensors that are arranged two-dimensionally (for example, in a grid pattern) along the touch panel 11. As another example, the hand detecting sensor 12 may include one or more infrared light emitting portions and one or more infrared light receiving portions, wherein the infrared light emitting portions emit infrared light toward a hand that is proximate to the touch panel 11, and the infrared light receiving portions receive infrared light reflected from the hand. As a further example, the hand detecting sensor 12 may be a camera that photographs a hand that is proximate to the touch panel 11, from the touch panel 11 side. It is noted that in a case where the present disclosure is applied to an operation panel of a stationary apparatus such as the image forming apparatus, a camera attached to a ceiling or a wall may be used as the hand detecting sensor 12.

The storage portion 13 is a nonvolatile storage portion such as an EEPROM™. The storage portion 13 stores various types of control programs that are executed by the control portion 14, and pattern information D1 (see FIG. 5) that is described below.

The control portion 14 includes control equipment such as a CPU, a ROM, and a RAM. The CPU is a processor that executes various calculation processes. The ROM is a nonvolatile storage portion in which various information such as control programs for causing the CPU to execute various processes are stored in advance. The RAM is a volatile or nonvolatile storage portion that is used as a temporary storage memory (working area) for the various processes executed by the CPU.

Specifically, the control portion 14 includes a hand detecting processing portion 141, a region setting processing portion 142, a collation processing portion 143, a generation processing portion 144, and a display control portion 145. It is noted that the control portion 14 functions as processing portions by executing various processes in accordance with the control programs. In addition, the control portion 14 may include an electronic circuit that realizes one or more processing functions of the processing portions.

The hand detecting processing portion 141 detects a position and a shape of a hand that is proximate to the touch panel 11. Specifically, the hand detecting processing portion 141 detects the position and the shape of the hand that is proximate to the touch panel 11, based on a signal output from the hand detecting sensor 12. For example, in a case where a camera for photographing a hand that is proximate to the touch panel 11 is used as the hand detecting sensor 12, the hand detecting processing portion 141 detects the position and the shape of the hand that is proximate to the touch panel 11 by executing a binarization process, a contour extraction process and the like on image data output from the camera.

The region setting processing portion 142 sets the touch invalid region A1 in the touch panel 11 based on the position and the shape of the hand detected by the hand detecting processing portion 141. In the present embodiment, the region setting processing portion 142 sets the touch invalid region A1 based on the result of collation performed by the collation processing portion 143 that is described below.

Figure 5:
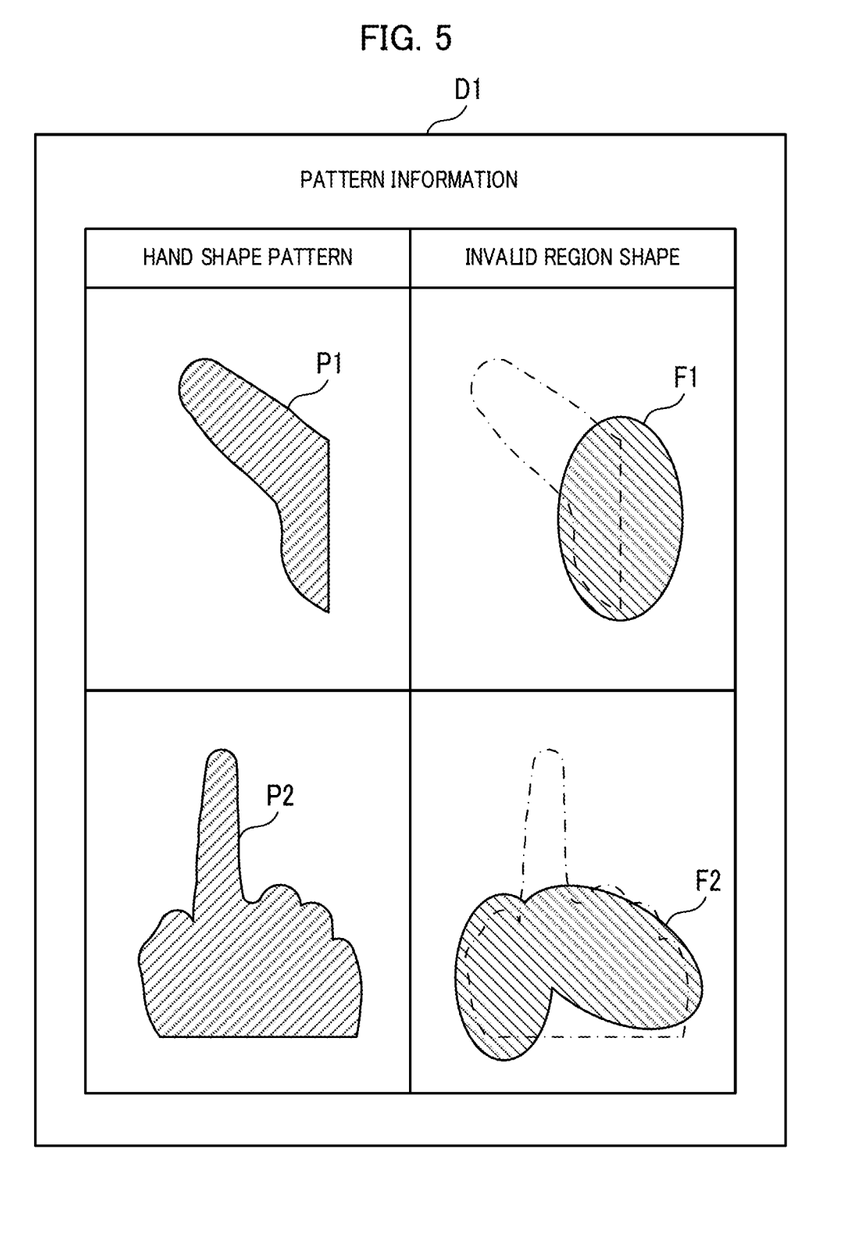
FIG. 5 is a diagram showing an example of pattern information used in the operation input device according to the embodiment of the present disclosure.

The collation processing portion 143 collates the shape of the hand detected by the hand detecting processing portion 141 with hand shape patterns P1 and P2 included in the pattern information D1 stored in the storage portion 13. As shown in FIG. 5, the pattern information D1 shows correspondence between the hand shape patterns P1 and P2 and invalid region shapes F1 and F2, wherein the hand shape patterns P1 and P2 represent hand shapes, and the invalid region shapes F1 and F2 represent shapes of the touch invalid region A1. The pattern information D1 may be obtained from an external information processing apparatus via a network or an external storage medium, or may be generated by the generation processing portion 144 that is described below. In the collation process performed by the collation processing portion 143, an arbitrary one of known pattern matching methods may be adopted.

Figure 2A:
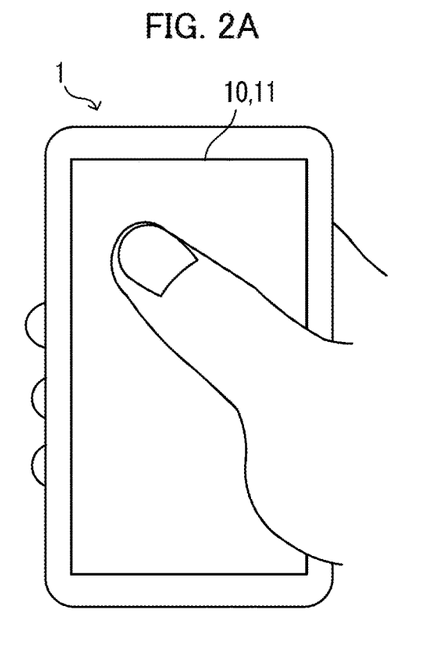
FIG. 2A is a diagram viewing a use of the operation input device according to the embodiment of the present disclosure from the front of the operation input device.
Figure 2B:
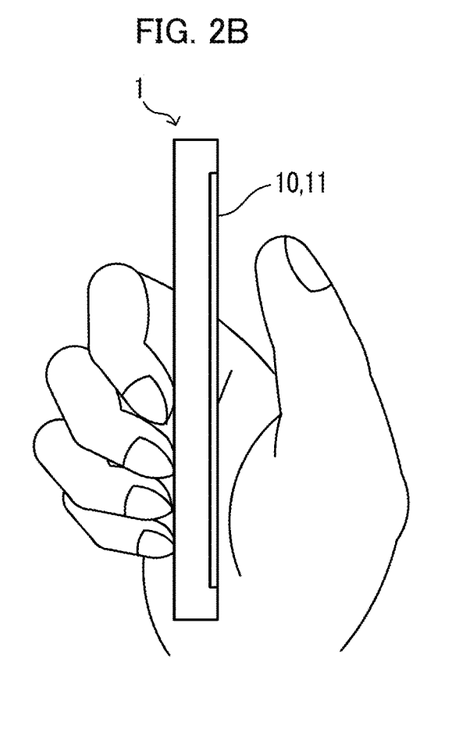
FIG. 2B is a diagram viewing the use of the operation input device according to the embodiment of the present disclosure from a side of the operation input device.

In the pattern information D1, hand shape patterns P1 and P2 that are likely to cause erroneous inputs are registered. For example, as shown in FIG. 2A and FIG. 2B, when the user holds the operation input device 1 by one hand (in this example, the right hand), and performs a touch operation with the thumb of the hand, the ball of the thumb may touch the touch panel 11 against user's intention, and it may result in an erroneous input. In a case where the operation input device 1 is operated with a hand as shown in FIG. 2A and FIG. 2B, a region of the touch panel 11 facing the ball of the thumb can be set as the touch invalid region A1 to prevent such an erroneous input. As a result, in the pattern information D1 shown in FIG. 5, a hand shape pattern P1 representing the shape of the hand shown in FIG. 2A and FIG. 2B, and an invalid region shape F1 corresponding to the hand shape pattern P1 are registered.

Figure 3A:
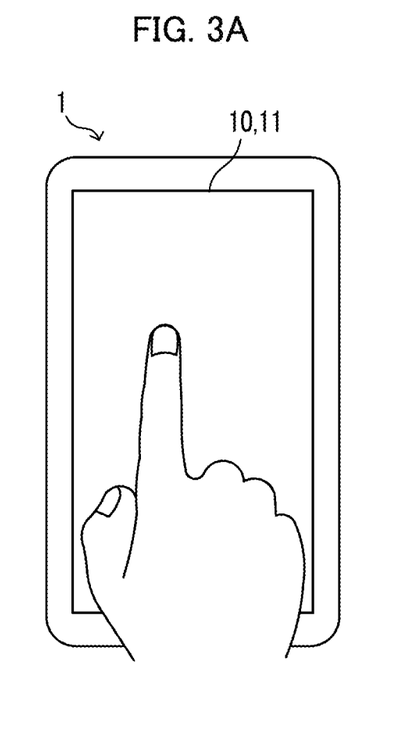
FIG. 3A is a diagram viewing a use of the operation input device according to the embodiment of the present disclosure from the front of the operation input device.
Figure 3B:
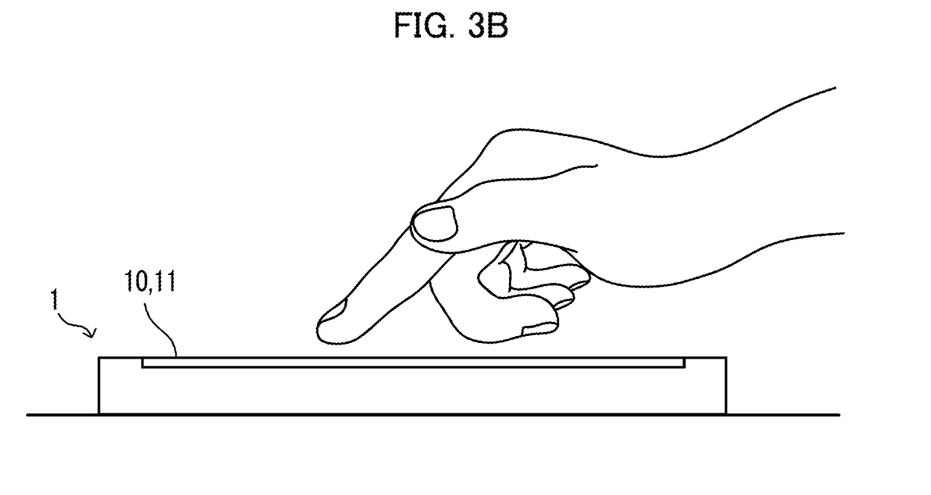
FIG. 3B is a diagram viewing the use of the operation input device according to the embodiment of the present disclosure from a side of the operation input device.

As another example, as shown in FIG. 3A and FIG. 3B, the user may perform a touch operation with an index finger on the operation input device 1 while it is placed on a desk or the like. In such a case, another finger (for example, the top joint of the middle finger) may touch the touch panel 11 against user's intention, and it may result in an erroneous input. In a case where the operation input device 1 is operated with a hand as shown in FIG. 3A and FIG. 3B, a region of the touch panel 11 facing the fingers other than the index finger can be set as the touch invalid region A1 to prevent such an erroneous input. As a result, in the pattern information D1 shown in FIG. 5, a hand shape pattern P2 representing the shape of the hand shown in FIG. 3A and FIG. 3B, and an invalid region shape F2 corresponding to the hand shape pattern P2 are registered.

Figure 4A:
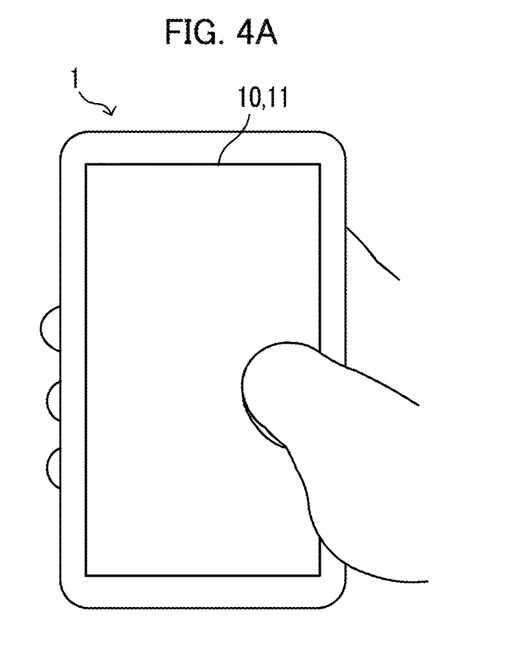
FIG. 4A is a diagram viewing a use of the operation input device according to the embodiment of the present disclosure from the front of the operation input device.
Figure 4B:
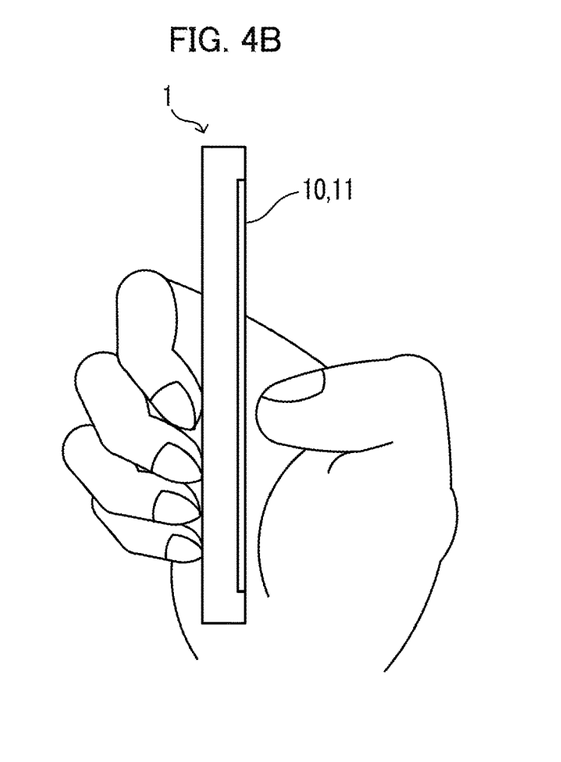
FIG. 4B is a diagram viewing the use of the operation input device according to the embodiment of the present disclosure from a side of the operation input device.

It is noted that even in a case where the user holds the operation input device 1 by one hand (for example, the right hand), and performs a touch operation with the thumb of the hand, when, as shown in FIG. 4A and FIG. 4B, the user is touching the right-end part of the display portion 10, the ball of the thumb does not face the touch panel 11, and thus an erroneous input does not occur. Accordingly, in a case where the operation input device 1 is operated with the hand in the state shown in FIG. 4A and FIG. 4B, there is no need to set the touch invalid region A1, and thus in the pattern information D1 shown in FIG. 5, no hand shape pattern representing the shape of the hand shown in FIG. 4A and FIG. 4B is registered.

Figure 6A:
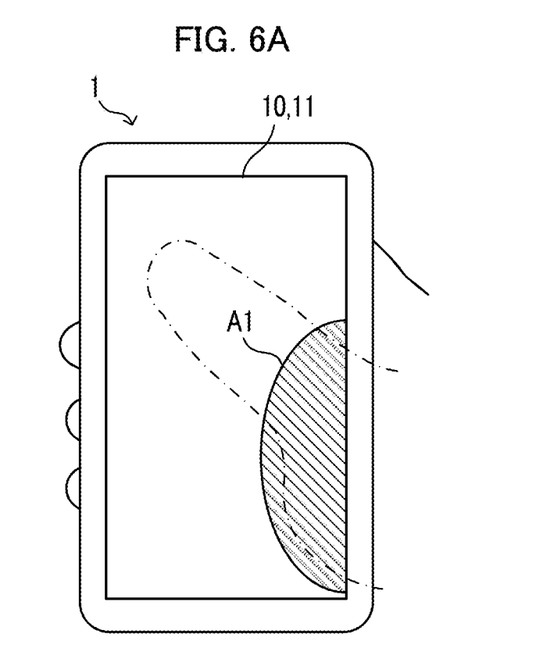
FIG. 6A is a diagram showing an example of a touch invalid region set in the operation input device according to the embodiment of the present disclosure.
Figure 6B:
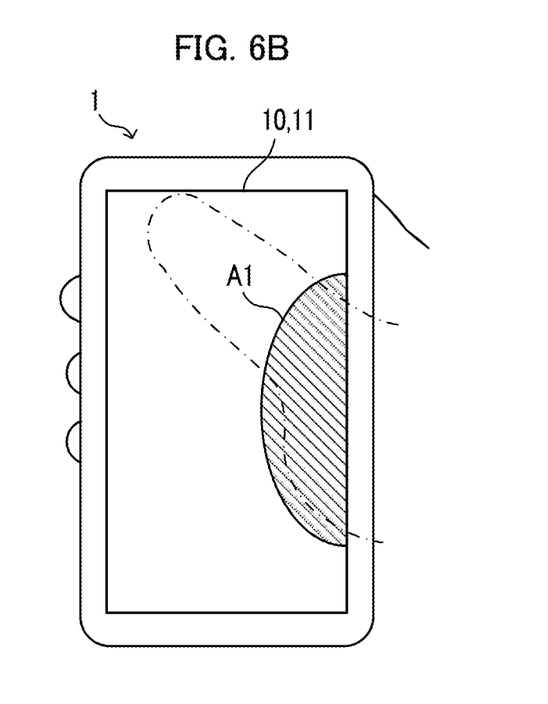
FIG. 6B is a diagram showing an example of a touch invalid region set in the operation input device according to the embodiment of the present disclosure.

The region setting processing portion 142 sets the touch invalid region A1 based on one of the invalid region shapes that corresponds to the result of the collation performed by the collation processing portion 143, and based on the hand position detected by the hand detecting processing portion 141. Specifically, the pattern information D1 indicates relative positions of the invalid region shapes F1 and F2 with respect to the hand shape patterns P1 and P2, and the region setting processing portion 142 determines the position of the touch invalid region A1 in the touch panel 11 based on the position of the hand detected by the hand detecting processing portion 141, and a relative position of an invalid region shape that corresponds to the result of collation performed by the collation processing portion 143. For example, in the pattern information D1 shown in FIG. 5, the positions (the above-mentioned relative positions) of the invalid region shapes F1 and F2 are defined based on the positions of the hand shape patterns P1 and P2 represented by the one-dot chain line. This allows the touch invalid region A1 to be set based on the position of the hand detected by the hand detecting processing portion 141. As a result, as shown in FIG. 6A and FIG. 6B, even when the position of the hand changes with respect to the display portion 10, the touch invalid region A1 is set to the position facing the ball of the thumb.

The generation processing portion 144 generates the pattern information D1 in accordance with the user operation. Specifically, the generation processing portion 144 obtains, as the hand shape pattern, the shape of the hand detected by the hand detecting processing portion 141, and sets the touch invalid region A1 in correspondence with the hand shape pattern in accordance with the user operation.

Figure 7:
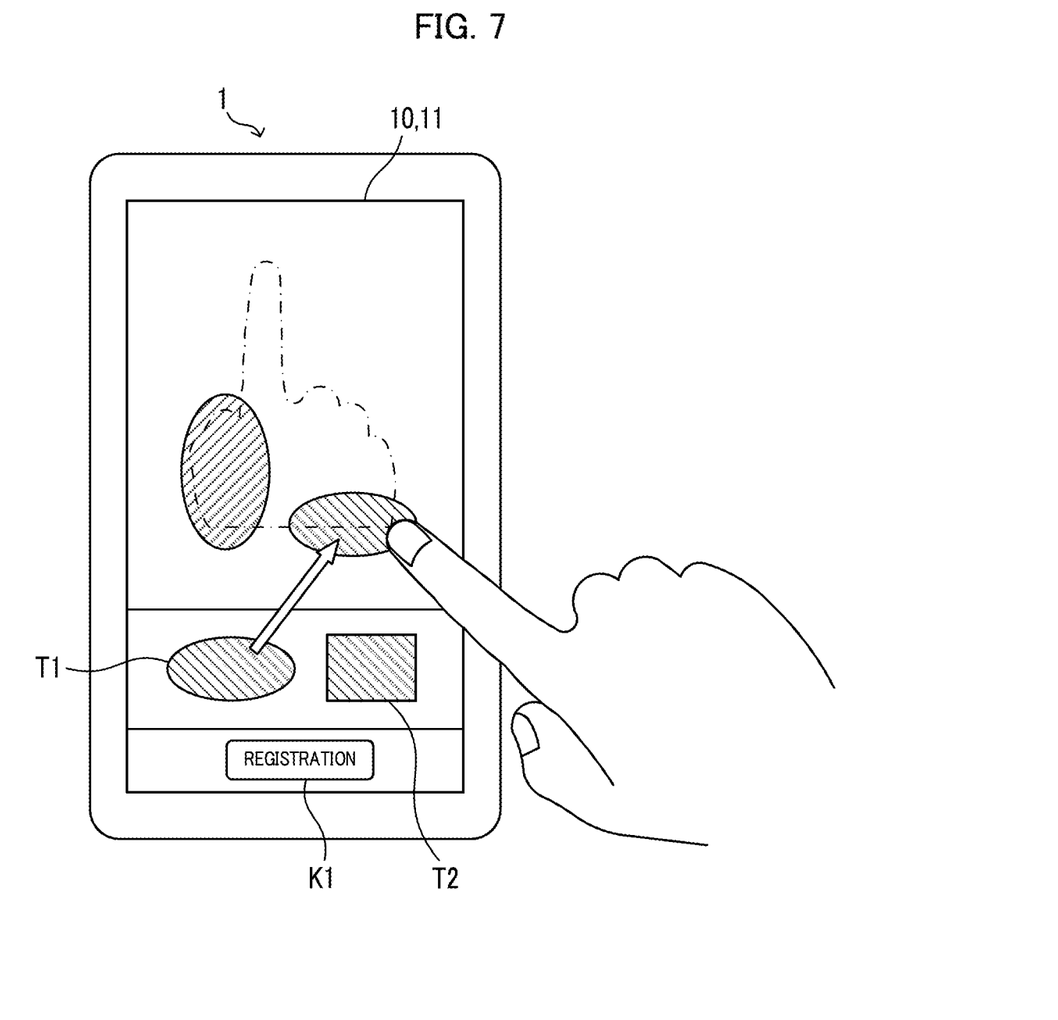
FIG. 7 is a diagram showing an example of an invalid region registration screen displayed in the operation input device according to the embodiment of the present disclosure.

The user, for example, can request a start of a pattern information generating process, from a setting menu screen (not shown) displayed on the display portion 10. When the start of the pattern information generating process is requested, the generation processing portion 144, for example, displays, on the display portion 10, a message that urges the user to bring his/her hand proximate to the display portion 10. After a predetermined time (for example, several seconds) passes, a shape of the hand of the user at that point in time is detected by the hand detecting processing portion 141. Subsequently, the generation processing portion 144 displays an invalid region registration screen shown in FIG. 7 on the display portion 10. On the invalid region registration screen, a hand shape pattern representing the shape of the hand detected by the hand detecting processing portion 141 is displayed as indicated by the one-dot chain line in FIG. 7. In addition, in the invalid region registration screen, one or more template figures T1 and T2 representing invalid regions are displayed. The user can set a relative position of the touch invalid region A1 with respect to the position of the hand by dragging an arbitrary template figure to an arbitrary position on the hand shape pattern and dropping it thereon. In addition, the user can rotate, enlarge, or reduce the template figure arranged on the hand shape pattern by using, for example, two fingers. When an operation key K1 is operated on the invalid region registration screen, the generation processing portion 144 generates the pattern information D1 based on the position and the shape of the template figure arranged on the hand shape pattern, and stores the generated pattern information D1 in the storage portion 13.

The display control portion 145 displays an image representing the touch invalid region A1 on the display portion 10 based on the touch invalid region A1 set by the region setting processing portion 142. For example, the display control portion 145 may overlay a contour line image that represents the contour of the touch invalid region A1 on an arbitrary screen (for example, the home screen) displayed on the display portion 10. Alternatively, in an arbitrary screen displayced on the display portion 10, the display control portion 145 may display the touch invalid region A1 in a different manner from the region outside the touch invalid region A1. For example, the display control portion 145 may display the touch invalid region A1 brighter than the other region. This enables the user to easily recognize whether or not the touch invalid region A1 has been set appropriately.

[Touch Input Process]

Figure 8:
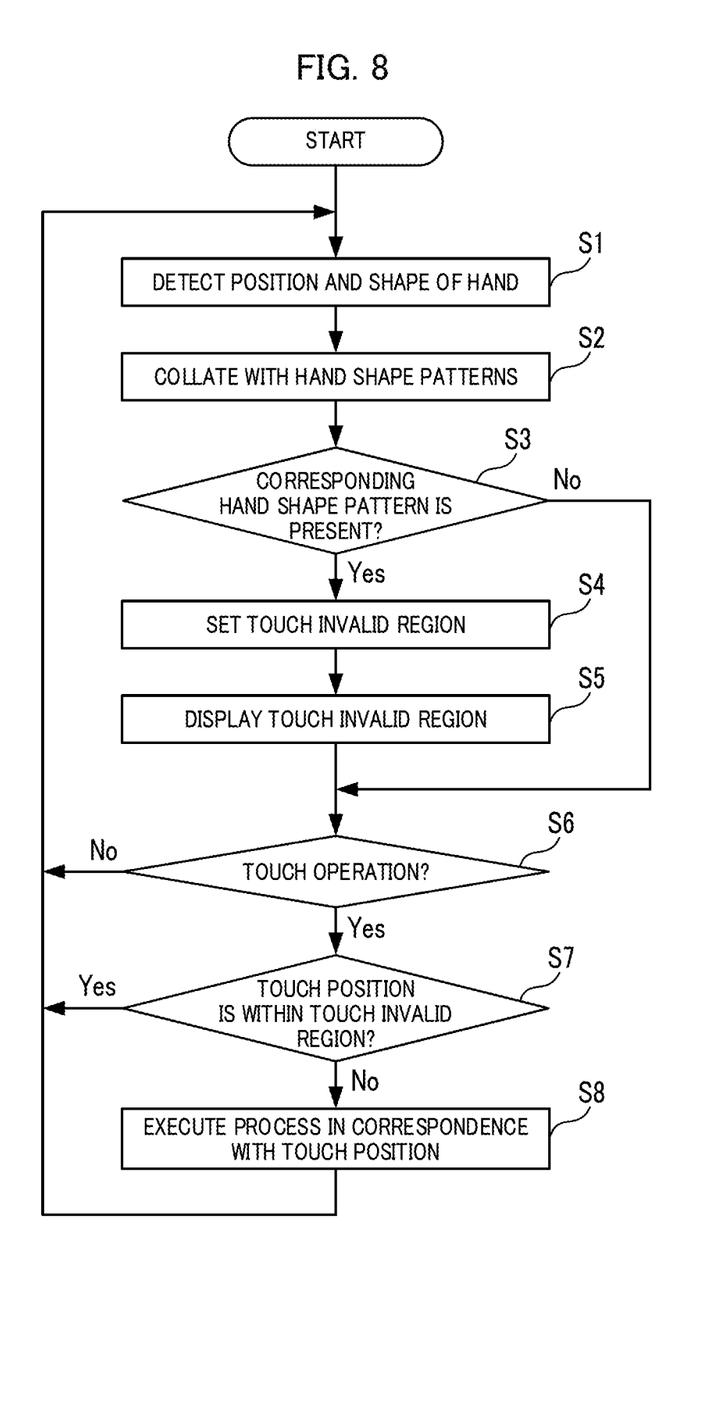
FIG. 8 is a flowchart showing an example of procedure of a touch input process executed by the operation input device according to the embodiment of the present disclosure.

In the following, an example of the procedure of a touch input process executed by the control portion 14 is described with reference to FIG. 8. Here, steps S1, S2, . . . represent numbers assigned to the processing procedures (steps) executed by the control portion 14. It is noted that the touch input process shown in FIG. 8 is, for example, started in response to a power-on of the operation input device 1, and is ended in response to a power-off of the operation input device 1.

<Step S1>

In step S1, the control portion 14 (the hand detecting processing portion 141) detects a position and a shape of a hand that is proximate to the touch panel 11, based on a signal output from the hand detecting sensor 12. The process of the step S1 is an example of the hand detecting step of the present disclosure.

<Step S2>

In step S2, the control portion 14 (the collation processing portion 143) collates the shape of the hand detected in the step S1 with the hand shape patterns P1 and P2 included in the pattern information D1 stored in the storage portion 13.

<Step S3>

In step S3, the control portion 14 determines, based on the result of the collation performed in the step S2, whether or not a hand shape pattern corresponding to the shape of the hand detected in the step S1 is present in the pattern information D1. When it is determined that the hand shape pattern is present in the pattern information D1 (S3: Yes), the process moves to step S4. On the other hand, when it is determined that the hand shape pattern is not present in the pattern information D1 (S3: No), the process moves to step S6.

<Step S4>

In step S4, the control portion 14 (the region setting processing portion 142) sets the touch invalid region A1 based on an invalid region shape that corresponds to the shape pattern (namely, a hand shape pattern corresponding to the shape of the hand detected in the step S1) included in the pattern information D1.

<Step S5>

In step S5, the control portion 14 (the display control portion 145) displays the touch invalid region A1 set in the step S4 on the display portion 10.

<Step SG>

In step S6, the control portion 14 determines whether or not a touch operation has been performed, based on a signal output from the touch panel 11. When it is determined that a touch operation has been performed (SG: Yes), the process moves to step S7. On the other hand, when it is determined that a touch operation has not been performed (SG: No), the process returns to the step S1.

\<Step S7\>

In step S7, the control portion 14 determines whether or not a touch position of the touch operation is within the touch invalid region A1 set in the step S4. When it is determined that the touch position is within the touch invalid region A1 (S7: Yes), the process returns to the step S1. On the other hand, when it is determined that the touch position is outside of the touch invalid region A1 (S7: No), the process moves to step S8.

\<Step S8\>

In step S8, the control portion 14 executes a process in correspondence with the touch position. For example, when an icon for activating application software is displayed at the touch position, the control portion 14 activates the application software. The process then returns to the step S1.

[Pattern Information Generating Process]

Figure 9:
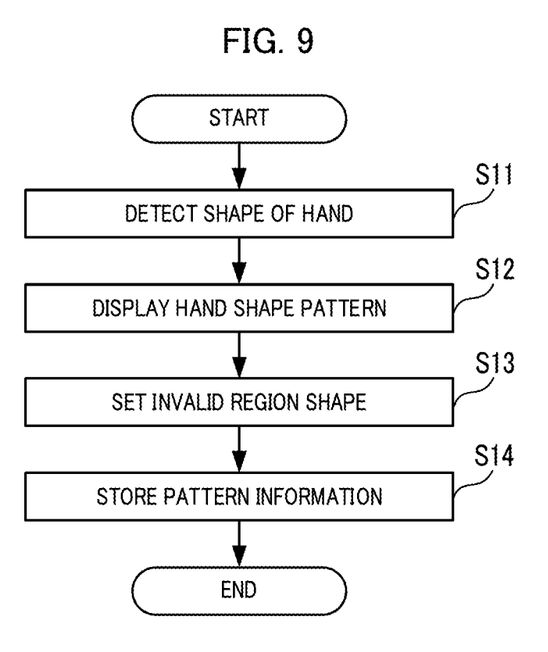
FIG. 9 is a flowchart showing an example of procedure of a pattern information generating process executed by the operation input device according to the embodiment of the present disclosure.

Next, an example of the procedure of the pattern information generating process executed by the control portion 14 is described with reference to FIG. 9. Here, steps S11, S12, . . . represent numbers assigned to the processing procedures (steps) executed by the control portion 14. It is noted that the pattern information generating process shown in FIG. 9 is, for example, started when the user requests, via the touch panel 11, a start of the pattern information generating process.

\<Step S11\>

In step S11, the control portion 14 (the hand detecting processing portion 141) detects a shape of a hand that is proximate to the touch panel 11, based on a signal output from the hand detecting sensor 12.

\<Step S12\>

In step S12, the control portion 14 (the generation processing portion 144) displays a hand shape pattern representing the shape of the hand detected in the step S11, on the display portion 10. For example, the control portion 14 displays the invalid region registration screen shown in FIG. 7 on the display portion 10.

\<Step S13\>

In step S13, the control portion 14 (the generation processing portion 144) sets an invalid region shape corresponding to the hand shape pattern, in accordance with a user operation performed on the touch panel 11.

\<Step S14\>

In step S14, the control portion 14 (the generation processing portion 144) generates the pattern information D1 that includes a hand shape pattern representing the shape of the hand detected in the step S11, and the invalid region shape set in the step S13, and stores the pattern information D1 in the storage portion 13. This ends the pattern information generating process.

As described above, in the present embodiment, a position and a shape of a hand that is proximate to the touch panel 11 are detected, and the touch invalid region A1 in the touch panel 11 is set based on the detected position and shape of the hand. As a result, according to the present embodiment, it is possible to set the touch invalid region A1 appropriately based on the position and the shape of the hand that is proximate to the touch panel 11.

MODIFICATION EXAMPLES

Figure 10:
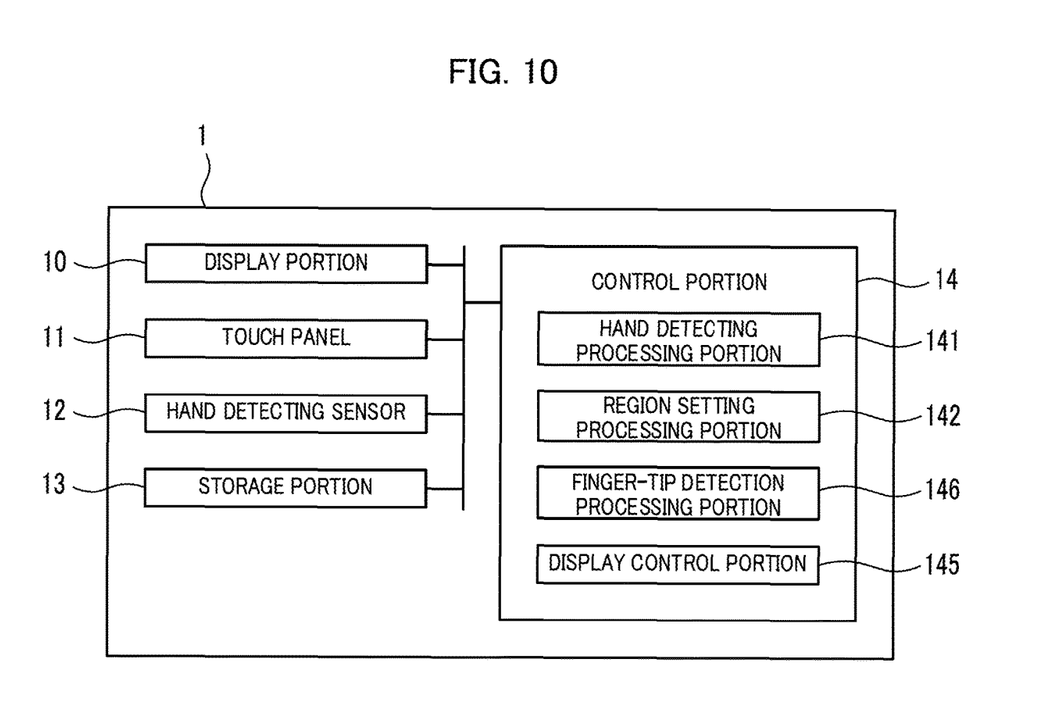
FIG. 10 is a block diagram showing a system configuration of an operation input device according to another embodiment of the present disclosure.
Figure 11:
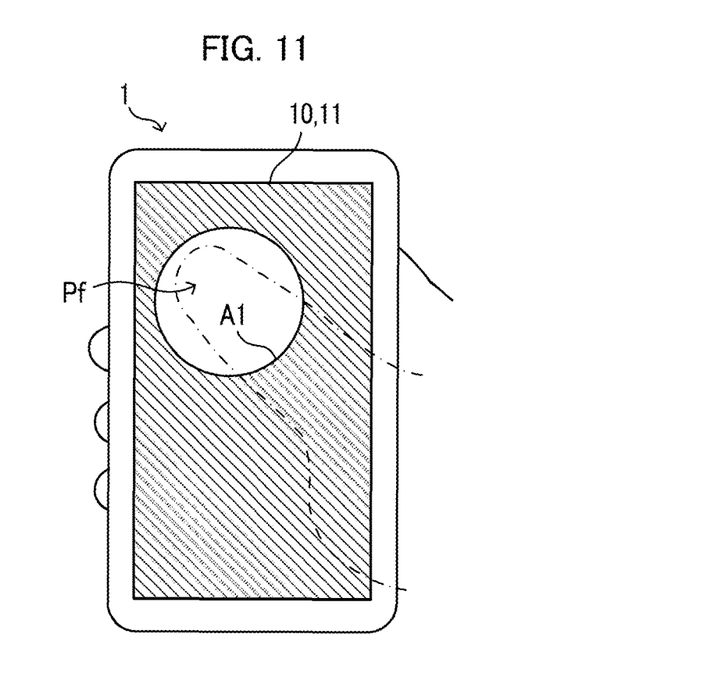
FIG. 11 is a diagram showing an example of a touch invalid region set in the operation input device according to the other embodiment of the present disclosure.

In the present embodiment, the touch invalid region A1 is set based on the pattern information D1. However, the present disclosure is not limited to this configuration. For example, as another embodiment, as shown in FIG. 10, the control portion 14 may include a finger-tip detection processing portion 146. The finger-tip detection processing portion 146 detects a finger-tip position Pf based on the shape of the hand detected by the hand detecting processing portion 141. The finger-tip detection processing portion 146 may detect the finger-tip position Pf based on, for example, the curvature of a contour line of the shape of the hand detected by the hand detecting processing portion 141. Furthermore, the region setting processing portion 142 may set the touch invalid region A1 based on the finger-tip position Pf detected by the finger-tip detection processing portion 146. For example, as shown in FIG. 11, the region setting processing portion 142 may set, as the touch invalid region A1, a region that is outside of a predetermined range (a range that is set based on the finger-tip position Pf) that includes the finger-tip position Pf detected by the finger-tip detection processing portion 146.

In addition, in the flowchart shown in FIG. 8, processes of the steps S1 to S5 are executed repeatedly regardless of whether a touch operation has been performed. However, the present disclosure is not limited to this configuration. For example, as another example, processes of the steps S1 to S4 may be executed only immediately after it is determined in step S6 that a touch operation has been performed.

In addition, in the present embodiment, the hand detecting processing portion 141 detects a two-dimensional shape of a hand. However, the present disclosure is not limited to this configuration. The hand detecting processing portion 141 may detect a three-dimensional shape of a hand. In this case, the pattern information D1 may include three-dimensional hand shape patterns that represent three-dimensional shapes of a hand. In addition, the collation processing portion 143 may collate a three-dimensional shape of a hand detected by the hand detecting processing portion 141 with the three-dimensional hand shape patterns included in the pattern information D1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An operation input device comprising:
    a display;
    a touch panel;
    a generation processor configured to generate pattern information and store the pattern information in a storage, the pattern information indicating relative positions of invalid region shapes with respect to hand shape patterns representing hand shapes, the invalid region shapes representing shapes of a touch invalid region in the touch panel;
    a hand detecting processor configured to detect a position and a shape of a hand that is proximate to the touch panel;
    a collation processor configured to collate the shape of the hand detected by the hand detecting processor with the hand shape patterns included in the pattern information;
    a region setting processor configured to set the touch invalid region based on the pattern information and the position and the shape of the hand detected by the hand detecting processor; and
    a display controller configured to overlay a contour line image that represents a contour of the touch invalid region on a screen displayed on the display, wherein the generation processor displays, on the display, the hand shape patterns and a plurality of template figures indicating the touch invalid region, the generation processor further rotates, enlarges, or reduces the template figures in accordance with an operation performed on the touch panel, the generation processor further sets a relative position of the touch invalid region with respect to the hand shape patterns in accordance with an operation of dragging one of the template figures to an arbitrary position on the hand shape patterns and dropping it thereon, and the region setting processor determines a position of the touch invalid region in the touch panel based on the position of the hand detected by the hand detecting processor, and based on a relative position of the one of the invalid region shapes that corresponds to the result of the collation performed by the collation processor.

2. The operation input device according to claim 1, wherein the generation processor generates the pattern information that includes three-dimensional hand shape patterns that represent three-dimensional shapes of a hand, the hand detecting processor detects a three-dimensional shape of the hand that is proximate to the touch panel, and the collation processor collates the three-dimensional shape of the hand with the three-dimensional hand shape patterns.

3. The operation input device according to claim 1, further comprising:

a finger-tip detection processor configured to detect a finger-tip position based on the shape of the hand detected by the hand detecting processor, wherein the region setting processor sets the touch invalid region based on the finger-tip position detected by the finger-tip detection processor.

4. An operation input method comprising:

a step of generating pattern information and storing the pattern information in a storage, the pattern information indicating relative positions of invalid region shapes with respect to hand shape patterns representing hand shapes, the invalid region shapes representing shapes of a touch invalid region in a touch panel;

a hand detecting step of detecting a position and a shape of a hand that is proximate to the touch panel;

a collation step of collating the shape of the hand detected in the hand detecting step with the hand shape patterns included in the pattern information;

a region setting step of setting the touch invalid region based on the pattern information and the position and the shape of the hand detected in the hand detecting step; and a step of overlaying a contour line image that represents a contour of the touch invalid region on a screen displayed on the display, wherein the step of generating pattern information includes:

displaying, on the display, the hand shape patterns and a plurality of template figures indicating the touch invalid region;

rotating, enlarging, or reducing the template figures in accordance with an operation performed on the touch panel; and setting a relative position of the touch invalid region with respect to the hand shape patterns in accordance with an operation of dragging one of the template figures to an arbitrary position on the hand shape patterns and dropping it thereon, and the region setting step includes determining a position of the touch invalid region in the touch panel based on the position of the hand detected in the hand detecting step, and based on a relative position of the one of the invalid region shapes that corresponds to the result of the collation performed in the collation step.

* * * * *